(12) United States Patent
Onur et al.

(10) Patent No.: US 12,307,921 B2
(45) Date of Patent: May 20, 2025

(54) QUANTITATIVE PILOT EVALUATION DURING TRAINING

(71) Applicant: THE BOEING COMPANY, Chicago, IL (US)

(72) Inventors: Can Onur, Bavaria (DE); Pieter van Gils, Madrid (ES); Barend-Jan van Bruchem, Madrid (ES)

(73) Assignee: THE BOEING COMPANY, Arlington, VA (US)

(*) Notice: Subject to any disclaimer, the term of this patent is extended or adjusted under 35 U.S.C. 154(b) by 662 days.

(21) Appl. No.: 16/777,590

(22) Filed: Jan. 30, 2020

(65) Prior Publication Data

US 2021/0241645 A1  Aug. 5, 2021

(51) Int. Cl.
| | |
|---|---|
| G09B 9/12 | (2006.01) |
| G09B 9/10 | (2006.01) |
| G09B 9/20 | (2006.01) |
| G09B 9/30 | (2006.01) |
| G09B 9/08 | (2006.01) |
| G09B 9/44 | (2006.01) |
| G09B 19/16 | (2006.01) |

(52) U.S. Cl.
CPC .............. G09B 9/12 (2013.01); G09B 9/10 (2013.01); G09B 9/206 (2013.01); G09B 9/302 (2013.01); *G09B 9/08* (2013.01); *G09B 9/44* (2013.01); *G09B 19/165* (2013.01)

(58) Field of Classification Search
CPC . G09B 9/12; G09B 9/10; G09B 9/206; G09B 9/302; G09B 19/165; G09B 9/44; G09B 9/08
USPC .......................................................... 434/30
See application file for complete search history.

(56) References Cited

U.S. PATENT DOCUMENTS

| | | | | |
|---|---|---|---|---|
| 5,075,881 A | * | 12/1991 | Blomberg | G06F 30/20 |
| | | | | 703/2 |
| 2008/0082372 A1 | * | 4/2008 | Burch | G06Q 40/08 |
| | | | | 705/4 |
| 2013/0268146 A1 | * | 10/2013 | Baudry | G01C 23/00 |
| | | | | 701/3 |

(Continued)

OTHER PUBLICATIONS

"NASA TLX Task Load Index," National Aeronautics and Space Administration, retrieved Nov. 21, 2019, 1 pg.

(Continued)

*Primary Examiner* — Jack Yip
(74) *Attorney, Agent, or Firm* — Moore IP Law

(57) ABSTRACT

A device for pilot training includes a memory, an interface, and one or more processors. The memory is configured to store at least one computational model of at least one human sensory system. The interface is configured to receive sensor data and aircraft state data from a flight simulator. The sensor data includes pilot activity data and motion data. The motion data is indicative of detected motion of a simulated aircraft of the flight simulator. The processor(s) are configured to process the motion data and the pilot activity data based on the at least one computational model to predict a pilot estimated aircraft state. The processor(s) are configured to determine an estimated error based on a comparison of the pilot estimated aircraft state and a detected aircraft state. The aircraft state data indicates the detected aircraft state. The processor(s) are configured to provide the estimated error to a second device.

20 Claims, 9 Drawing Sheets

(56) References Cited

U.S. PATENT DOCUMENTS

| | | | |
|---|---|---|---|
| 2013/0323688 A1 | 12/2013 | Whitlow et al. | |
| 2015/0022380 A1 | 1/2015 | Conner et al. | |
| 2015/0251771 A1 | 9/2015 | Whitlow et al. | |
| 2015/0269860 A1* | 9/2015 | Shaw | G09B 9/08 434/30 |
| 2016/0210871 A1* | 7/2016 | Wokurka | G09B 9/02 |
| 2017/0148340 A1* | 5/2017 | Popa-Simil | G09B 9/48 |
| 2017/0243505 A1* | 8/2017 | Dimock | G09B 9/12 |
| 2019/0130769 A1 | 5/2019 | Bravo et al. | |
| 2020/0118366 A1* | 4/2020 | Ryan | G07C 5/0866 |
| 2022/0111852 A1* | 4/2022 | Harris | B60W 40/02 |

OTHER PUBLICATIONS

Boy, Guy Andre, "Requirements for Single Pilot Operations in Commercial Aviation: A First High-Level Cognitive Function Analysis," Complex Systems Design and Management International Conference, Paris, France, 2014, 8 pgs.

Brandt, Summer L. et al., "Pilot situation awareness and its implications for single pilot operations: Analysis of a human-in-the-loop study," Procedia Manufacturing, vol. 3, 2015, pp. 3017-3024.

Charles, Rebecca L. et al., Measuring mental workload using physiological measures: A systematic review,: Applied Ergonomics vol. 74, 2019, pp. 221-232.

Chen, Haibing et al., "Pilot Control Behavior Analysis Using Cutoff Frequency and Power Frequency for a Civil Transport Aircraft Encountering Turbulence Based on Flight Simulation," Science Direct, Procedia Engineering, vol. 80, 2014, pp. 424-430.

Merfeld, Danieli M. et al., "A Multidimensional Model of the Effect of Gravity on the Spatial Orientation of the Monkey," Journal of Vestibular Research, vol. 3, 1993, pp. 141-161.

Newman, David G., "An overview of spatial disorientation as a factor in aviation accidents and incidents," ATSB Transport Safety Investigation Report, Aviation Research and Analysis Report , 2007, 44 pgs.

Onur, Can, "Developing a Computational Model of the Pilot's Best Possible Expectation of Aircraft State Given Vestibular and Visual Cues," A Thesis Presented to the Academic Faculty in partial fulfillment of the Requirements for the Degree Master of Science in the School of Aerospace Engineering, Georgia Institute of Technology, Dec. 2014, 85 pgs.

Onur, Can, et al., Pilot Perception and Control Behavior Models as a Tool to Assess Motion-Cueing Algorithms, AIAA Aviation Forum, Jun. 2017, AIAA Modeling and Simulation Technologies Conference, pp. 1-14.

Pilot Flying (PF) and Pilot Monitoring (PM) , retrieved Jan. 29, 2019, 3 pgs.

Pommellet, Pierre E., "Suboptimal Estimator for the Spatial Orientation of a Pilot," Submitted in Partial Fulfillment of the Requirements for the Degree of Master of Science in Aeronautics and Astronautics at the Massachusetts Institute of Technology, Sep. 1990, 89 pgs.

Roscoe, A. H., "Assessing pilot workload. Why measure heart rate, HRV and respiration?" Elsevier Science Publishers B.V., 1992, Biological Psychology, vol. 34, pp. 259-287.

Wilson, G. F., et al., "Physiological Data Used to Measure Pilot Workload in Actual Flight and Simulator Conditions," Proceedings of the Human Factors Society, 31st Annual Meeting, 1987, pp. 779-783.

Young, L. R., "The Current Status of Vestibular System Models," Automatica, vol. 5,Pergamon Press, pp. 369-383.

Bozan, Anil et al., "Applying a model-based observer to estimate pilot expectation,I" IEEE/AIAA 33rd Digital Avionics Systems Conference, IEEE, Oct. 5, 2014, DOI: 10.1109/DASC.2014.6979426, pp. 2C1-1-2C1-2.

Extended European Search Report for application No. 21154431.7 dated Jul. 13, 2021, 8 pgs.

Communication pursuant to Article 94(3) EPC for application No. 21154431.7, dated Feb. 21, 2024, pp. 1-9.

\* cited by examiner

QUANTITATIVE PILOT EVALUATION DURING TRAINING

FIELD OF THE DISCLOSURE

The present disclosure is generally related to quantitative pilot evaluation during training.

BACKGROUND

Pilots can experience spatial disorientation during flight because of the way in which the human mind processes sensory information. For example, the pilot can perceive constant change (e.g., sustained acceleration) as no change. A pilot's perception of the state of the aircraft differing from the actual state of the aircraft can result in spatial disorientation.

SUMMARY

In a particular implementation, a device for pilot training includes a memory, an interface, and one or more processors. The memory is configured to store at least one computational model of at least one human sensory system. The interface is configured to receive sensor data and aircraft state data from a flight simulator. The sensor data includes pilot activity data and motion data. The one or more processors are configured to process the motion data and the pilot activity data based on the at least one computational model to predict a pilot estimated aircraft state. The one or more processors are also configured to determine an estimated error based on a comparison of the pilot estimated aircraft state and a detected aircraft state (indicated by the aircraft state data). The one or more processors are further configured to provide the estimated error to a second device.

In another particular implementation, a method of pilot training includes receiving, at a device, sensor data and aircraft state data from a flight simulator. The sensor data includes pilot activity data and motion data. The motion data is indicative of detected motion of a simulated aircraft of the flight simulator. The method also includes processing, at the device, the motion data and the pilot activity data based on at least one computational model of at least one human sensory system to predict a pilot estimated aircraft state. The method further includes determining, at the device, an estimated error based on a comparison of the pilot estimated aircraft state and a detected aircraft state. The aircraft state data indicates the detected aircraft state. The method also includes providing the estimated error to a display.

In another particular implementation, a computer-readable storage device stores instructions that, when executed by one or more processors, cause the one or more processors to initiate, perform, or control operations to receive sensor data and aircraft state data from a flight simulator. The sensor data includes pilot activity data and motion data. The motion data is indicative of detected motion of a simulated aircraft of the flight simulator. The operations also include processing the motion data and the pilot activity data based on at least one computational model of at least one human sensory system to predict a pilot estimated aircraft state. The operations further include determining an estimated error based on a comparison of the pilot estimated aircraft state and a detected aircraft state. The aircraft state data indicates the detected aircraft state. The operations also include providing the estimated error to a device.

In another particular implementation, a device for pilot evaluation during aircraft operation includes a memory, an interface, and one or more processors. The memory is configured to store at least one computational model of at least one human sensory system. The interface is configured to receive sensor data and aircraft state data of an aircraft. The sensor data includes pilot activity data and motion data. The one or more processors are configured to process the motion data and the pilot activity data based on the at least one computational model to predict a pilot estimated aircraft state. The one or more processors are also configured to determine an estimated error based on a comparison of the pilot estimated aircraft state and a detected aircraft state. The aircraft state data indicates the detected aircraft state. The one or more processors are further configured to selectively activate a notification based, at least in part, on the estimated error.

In another particular implementation, a method of pilot evaluation during aircraft operation includes receiving, at a device, sensor data and aircraft state data of an aircraft. The sensor data includes pilot activity data and motion data. The method also includes processing, at the device, the motion data and the pilot activity data based on at least one computational model of at least one human sensory system to predict a pilot estimated aircraft state. The method further includes determining, at the device, an estimated error based on a comparison of the pilot estimated aircraft state and a detected aircraft state. The aircraft state data indicates the detected aircraft state. The method also includes selectively activating a notification based, at least in part, on the estimated error.

In another particular implementation, a computer-readable storage device stores instructions that, when executed by a processor, cause the processor to perform operations including receiving sensor data and aircraft state data of an aircraft. The sensor data includes pilot activity data and motion data. The operations also include processing the motion data and the pilot activity data based on at least one computational model of at least one human sensory system to predict a pilot estimated aircraft state. The operations further include determining an estimated error based on a comparison of the pilot estimated aircraft state and a detected aircraft state. The aircraft state data indicates the detected aircraft state. The operations also include selectively activating a notification based, at least in part, on the estimated error.

The features, functions, and advantages described herein can be achieved independently in various implementations or may be combined in yet other implementations, further details of which can be found with reference to the following description and drawings.

DETAILED DESCRIPTION

Aspects disclosed herein present quantitative pilot evaluation during training and during aircraft operation. For example, aspects disclosed herein include systems and methods for predicting an estimate by a pilot of the state of an aircraft. The aircraft can include a simulated aircraft of a flight simulator or an actual aircraft. Quantitative pilot evaluation is performed during training (e.g., during a simulated flight) or during aircraft operation (e.g., during an actual flight). In some examples, the pilot may be designated as a "Pilot Flying," a "Pilot Monitoring," a "Pilot Not Flying," a captain, a co-pilot, a student, an instructor, or a combination thereof. In some examples, the pilot may include any person sitting in a pilot seat. The prediction of the pilot estimate is based on computational models of human sensory systems. For example, sensor data of the aircraft includes motion data indicating motion information that would be received by (e.g., experienced by) the pilot. In an example, the motion data corresponds to a linear acceleration of the aircraft. In this example, the computational models can predict that the human sensory systems of the pilot are likely to perceive no linear change responsive to a sustained linear acceleration corresponding to the motion data. The sensor data can also indicate pilot activity data. The pilot activity data can be used to update the prediction. In a particular example, the pilot activity data indicates that an instrument display indicating the sustained linear acceleration is within a line-of-sight of the pilot at a particular time. The prediction can be updated responsive to determining that the pilot has likely seen that the instrument display indicates the sustained linear acceleration and mentally corrected the false perception of the human sensory systems. For example, the updated prediction indicates that the pilot is likely to estimate a sustained linear acceleration.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Figure 1:
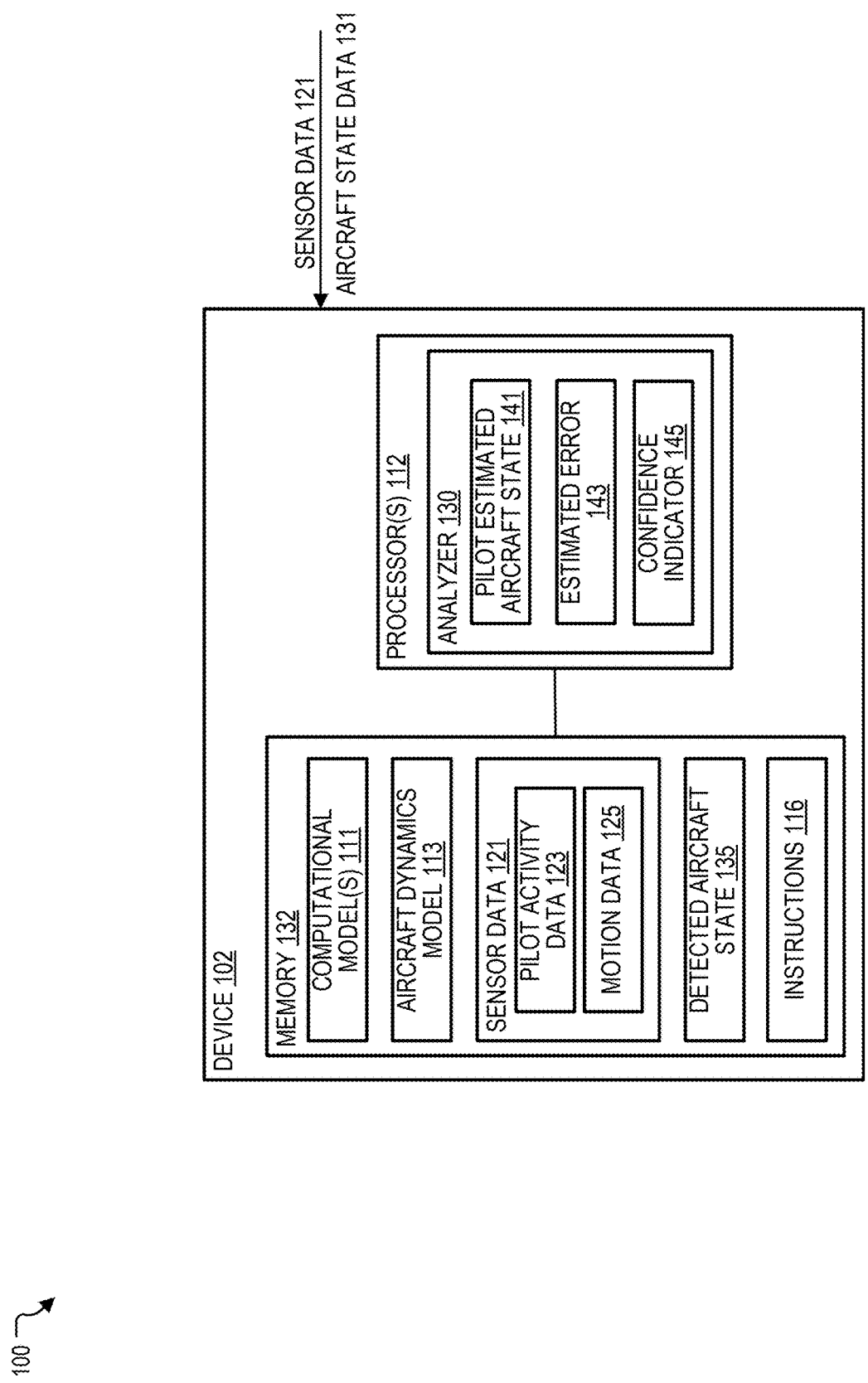
FIG. 1 is a diagram that illustrates a system configured to predict an aircraft state estimated by a pilot.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a system 100 including one or more computational models ("computational model(s)" 111 in FIG. 1), which indicates that in some implementations the system 100 includes a single computational model 111 and in other implementations the system 100 includes multiple computational models 111. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Referring to FIG. 1, a system configured to predict an aircraft state estimated by a pilot is shown and generally designated system 100. The system 100 includes a device 102 that includes a memory 132 coupled to one or more processors 112. The memory 132 includes a computer-readable medium (e.g., a computer-readable storage device) that stores instructions 116 that are executable by the processor 112. The instructions 116 are executable to initiate, perform, or control operations to aid in predicting an aircraft state estimated by a pilot.

In a particular example, the memory 132 includes one or more computational models 111 of one or more human sensory systems. In various examples, the computational models 111 include a vestibular model, a visual model, a proprioceptive model, or a combination thereof. To illustrate, a human vestibular system is located in the inner ear and detects linear motion and angular motion. Prolonged maneuvers, constantly changing accelerations, and a wide range of maneuver rates can cause illusions and misinterpretation of actual orientation. In a particular aspect, the computational models 111 are configured to, based on motion data 125, predict a pilot estimated aircraft state 141 corresponding to the misinterpretations (if any) caused by the human sensory systems. The motion data 125 is indicative of detected motion of an aircraft. In a particular aspect, the motion data 125 is generated by one or more motion sensors (e.g., an inertial measurement unit (IMU)). The motion data 125 includes angular motion data, linear motion data, or both. For example, the motion data 125 indicates a rotation about a yaw-axis, a rotation about a pitch-axis, a rotation about a roll-axis, a linear motion, or a combination thereof. The pilot estimated aircraft state 141 includes an estimated lateral position, an estimated longitudinal position, an estimated altitude, an estimated attitude, an estimated linear motion, an estimated angular motion, or a combination thereof, of the aircraft.

In a particular example, the memory 132 includes an aircraft dynamics model 113. Pilots can use experience and training to form an internal model to estimate aircraft state. For example, a more experienced pilot can form a more accurate estimation of an aircraft state than a less experienced pilot based on the same motion of the aircraft. The internal model can also be based on visual aircraft state indicators. For example, a pilot can use visual aircraft state indicators to estimate the aircraft state. Visual aircraft state indicators can include an instrument display, an environmental feature, or both. In a particular example, the instrument display includes an altimeter, an attitude indicator, a heading indicator, an airspeed indicator, a turn coordinator, a vertical speed indicator, a latitude indicator, a longitude indicator, or a combination thereof. In a particular example, the environmental feature includes a landmark, one or more stars, a moon, a horizon, or a combination thereof. The aircraft dynamics model 113 approximates the internal model of a pilot. In a particular aspect, the aircraft dynamics model 113 can be representative of a novice pilot, an average pilot, or an expert pilot. For example, the aircraft dynamics model 113 can be used to predict the pilot estimated aircraft state 141 corresponding to a pilot having a particular experience level. In a particular aspect, the aircraft dynamics model 113 includes, or is included within, the one or more computational models 111 of human sensory systems that are adjusted based on a particular pilot experience level and processes pilot activity data 123, a detected aircraft state 135, or both, in addition to motion data 125.

The processor 112 includes an analyzer 130 that can be implemented at least in part by the processor 112 executing the instructions 116. The processor 112 can be implemented as a single processor or as multiple processors, such as in a multi-core configuration, a multi-processor configuration, a distributed computing configuration, a cloud computing configuration, or any combination thereof. In some implementations, one or more portions of the analyzer 130 are implemented by the processor 112 using dedicated hardware, firmware, or a combination thereof. The analyzer 130 is configured to receive sensor data 121 and aircraft state data 131 of an aircraft. For example, the sensor data 121, the aircraft state data 131, or a combination thereof, is received from a flight simulator, as further described with reference to FIG. 2. As another example, the sensor data 121, the aircraft state data 131, or a combination thereof, is received from an actual aircraft, as further described with reference to FIG. 3.

The aircraft state data 131 indicates a detected aircraft state 135 of the aircraft. In a particular example, the aircraft state data 131 includes lateral position data, longitudinal position data, altitude data, attitude data, linear motion data, and angular motion data indicating a detected lateral position, a detected longitudinal position, a detected altitude, a detected attitude, a detected linear motion, and a detected angular motion, respectively of the aircraft. The analyzer 130 is configured to process the sensor data 121 using the computational model 111, the aircraft dynamics model 113, or both, to predict a pilot estimated aircraft state 141. The analyzer 130 is configured to determine an estimated error 143 based on a comparison of the pilot estimated aircraft state 141 and the detected aircraft state 135. The estimated error 143 can be used in pilot training, generating an alert notification, initiating autopilot control, etc.

In a particular aspect, the analyzer 130 is configured to determine a confidence indicator 145 (e.g., a confidence interval or a confidence value) of the estimated error 143. In a particular example, the confidence indicator 145 (e.g., a confidence value) indicates a likelihood that the estimated error 143 is correct. In a particular example, the confidence indicator 145 (e.g., a confidence interval) indicates a range of error values (e.g., plus or minus 5 percent) associated with a particular probability value (e.g., 2 standard deviations or 95 percent confidence). In a particular example, if the confidence indicator 145 indicates a low confidence in the estimated error 143 or indicates a wider than threshold range of error values for a particular probability value, the estimated error 143 may be disregarded. Alternatively, if the confidence indicator 145 indicates a high confidence in the estimated error 143 or indicates a narrower than threshold range of error values for the particular probability value, the estimated error 143 may be used in pilot training, to generate the alert notification, initiating autopilot control, etc.

Figure 2:
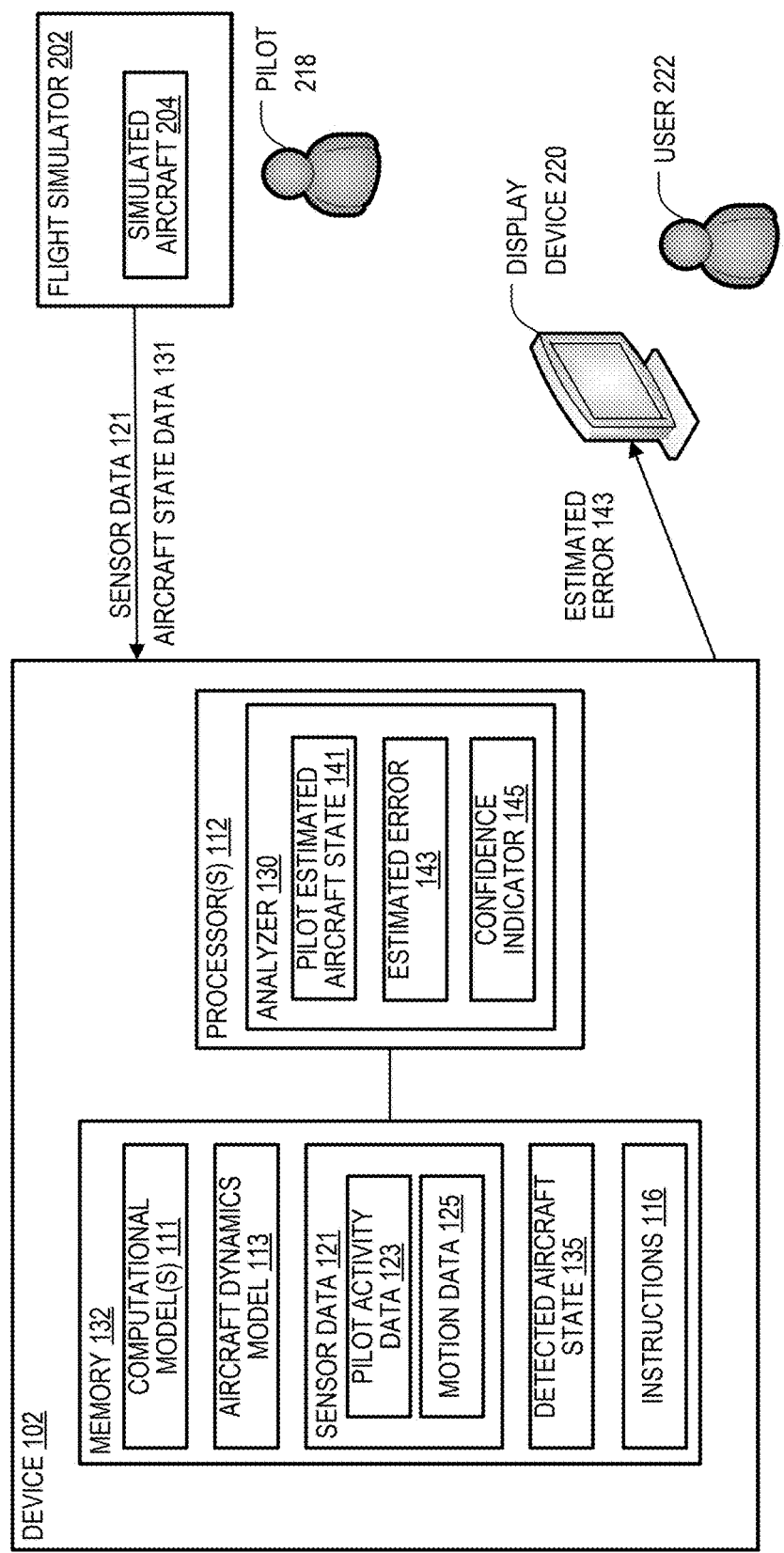
FIG. 2 is a diagram of a particular implementation of a system configured to predict an aircraft state estimated by a pilot during pilot training.

FIG. 2 depicts an example of a system 200 configured to predict an aircraft state estimated by a pilot 218 during pilot training. The device 102 is communicatively coupled to a flight simulator 202, a display device 220, or both.

During operation, the flight simulator 202 generates the sensor data 121, the aircraft state data 131, or a combination thereof, corresponding to a simulated aircraft 204. For example, a pilot 218 uses the flight simulator 202 during a pilot training session to operate the simulated aircraft 204. The simulated aircraft 204 can include a model of an aircraft cockpit. For example, the simulated aircraft 204 includes one or more instrument displays, such as an altimeter, an attitude indicator, a heading indicator, an airspeed indicator, a turn coordinator, a vertical speed indicator, a latitude indicator, a longitude indicator, or a combination thereof. The simulated aircraft 204 includes one or more aircraft controls, such as one or more of a throttle lever, a control wheel, a control yoke, a rudder pedal, a navigation control, or a flight control computer system. In some implementations, the flight simulator 202 simulates movement of an aircraft by moving the model aircraft cockpit. In some implementations, the flight simulator 202 includes a fixed base flight simulator in which the model aircraft cockpit is fixed (e.g., does not move). In a particular aspect, a projector projects images of one or more simulated external environmental features on screens of the model aircraft, such as a simulated landmark, a simulated sky, a simulated moon, one or more simulated stars, one or more simulated clouds, one or more simulated buildings, a simulated horizon, etc. The flight simulator 202 generates the sensor data 121 corresponding to one or more sensors. The sensors include an actual sensor, a simulated sensor, or both. For example, an actual sensor can include an image sensor that tracks pilot eye movement. In a particular example, a simulated sensor can include a simulated temperature sensor (e.g., a computer) that generates simulated fuel temperature readings.

The sensor data 121 includes pilot activity data 123, motion data 125, or both. The pilot activity data 123 indicates pilot monitoring activity, pilot control activity, or both. In a particular example, the pilot activity data 123 is based on a portion of the sensor data 121 received from one or more pilot monitoring sensors. The pilot monitoring sensors include a contact sensor, a non-contact sensor, an invasive sensor, a non-invasive sensor, or a combination thereof. For example, the pilot activity data 123 includes first activity sensor data received from a non-contact sensor, second activity sensor data received from a contact sensor, or both. The pilot monitoring sensors include, as illustrative non-limiting examples, a smart watch, a fitness tracker, a head-mounted sensor, a contact lens, an electrophysiological sensor, an intravenous fiberoptic system, a brain-machine interface, an image sensor, or a combination thereof.

In a particular aspect, the pilot activity data 123 indicates pilot monitoring activity, such as times at which various aircraft state indicators are within a line-of-sight of the pilot 218. An aircraft state indicator includes an instrument display, a simulated external environmental feature, or both. In a particular example, the flight simulator 202 generates the pilot activity data 123 based on the sensor data 121 (e.g., images from an image sensor), location data indicating locations of the aircraft state indicators, or a combination thereof, and provides the pilot activity data 123 to the analyzer 130. In a particular example, the analyzer 130 generates the pilot activity data 123 based on the sensor data 121 (e.g., the images), the location data, or a combination thereof. To illustrate, the flight simulator 202 (or the analyzer 130) determines that the sensor data 121 (e.g., an image) captured at a first time indicates that the pilot 218 is looking in a particular direction and that the location data indicates that a first aircraft state indicator is within a line-of-sight of the pilot 218 looking in the particular direction from a first location (e.g., cockpit seat) of the pilot 218. The flight simulator 202 (or the analyzer 130) generates (or updates) the pilot activity data 123 to indicate a pilot monitoring activity including the first aircraft state indicator being in a line-of-sight of the pilot 218 at the first time.

In a particular aspect, the pilot activity data 123 indicates pilot control activity, such as times at which the pilot 218 interacted with an aircraft control. For example, the flight simulator 202 (or the analyzer 130) determines that the sensor data 121 captured at a second time indicates that the pilot 218 moved a control wheel. The flight simulator 202 (or the analyzer 130) generates (or updates) the pilot activity data 123 to indicate a pilot control activity including moving the control wheel at the second time.

The motion data 125 is indicative of detected motion of the simulated aircraft 204. In a particular aspect, the motion data 125 includes angular motion data, linear motion data, or both, of the model aircraft cockpit of the simulated aircraft 204. For example, the motion data 125 includes a portion of the sensor data 121 that is received from one or more motion sensors (e.g., an IMU) coupled to the model aircraft cockpit of the simulated aircraft 204. In a particular example, the motion data 125 indicates a detected rotation about a yaw-axis, a detected rotation about a pitch-axis, a detected rotation about a roll-axis, a detected linear motion, or a combination thereof, of the model aircraft cockpit at various times. In a particular example, the pilot 218 seated in the model aircraft cockpit experiences the motion indicated by the motion data 125. In a particular example, the flight simulator 202 includes a fixed base flight simulator in which the model aircraft cockpit does not move. In this example, the motion data 125 indicates no movement.

In a particular example, the simulated aircraft 204 (e.g., represented by software) is based on a computational aircraft model that is used to generate motion data indicating motion of the simulated aircraft 204. The aircraft state data 131 indicates the motion data, such as a detected lateral position, a detected longitudinal position, a detected altitude, a detected attitude, a detected linear motion, a detected angular motion, or a combination thereof, of the simulated aircraft 204. The flight simulator 202 represents the motion data to the pilot 218 by visual cues, such as readings on instrument displays, simulated external environmental features displayed on screens of the model aircraft, etc. The pilot activity data 123 indicates whether the pilot 218 is likely to have perceived the visual cues.

In some implementations (e.g., with a motion based flight simulator), the flight simulator 202 moves the model aircraft cockpit of the simulated aircraft 204 based on the motion data generated by the computation aircraft model. In these implementations, the motion data 125 indicates the movement of the model aircraft cockpit that is based on the motion data generated by the computational aircraft model. In some implementations (e.g., with a fixed base flight simulator), the flight simulator 202 refrains from moving the model aircraft cockpit and the motion data 125 indicates no movement of the model aircraft cockpit. The motion data 125 (indicating no movement) may not be representative of the movement of the simulated aircraft 204 indicated by the motion data generated by the computational aircraft model. In these cases, although the motion data 125 indicates no movement of the model aircraft cockpit, the pilot activity data 123 can indicate whether the pilot 218 perceives movement (corresponding to the motion data generated by the computational aircraft model) of the simulated aircraft 204 based on visual cues.

The aircraft state data 131 indicates detected states of the simulated aircraft 204 at various times. For example, a detected aircraft state 135 includes a detected lateral position, a detected longitudinal position, a detected altitude, a detected attitude, a detected linear motion, a detected angular motion, or a combination thereof, of the simulated aircraft 204, at a first time. In a particular aspect, the aircraft state data 131 is generated by the flight simulator 202 based on a flight simulation, aircraft control operations performed (or initiated) by the pilot 218, or a combination thereof. In a particular aspect, the detected aircraft state 135 indicates a simulated state (e.g., a simulated altitude of 41,000 feet) of the simulated aircraft 204, and the motion data 125 indicates a detected physical motion (e.g., an 8-degree turn) of the model aircraft cockpit.

In a particular aspect, the analyzer 130 determines a pilot estimated aircraft state 141 based on the sensor data 121. For example, the analyzer 130 provides the motion data 125 to the computational model 111 to generate the pilot estimated aircraft state 141. To illustrate, the computational model 111

(e.g., a vestibular model, a visual model, a proprioceptive model, or a combination thereof) predicts that human sensory systems of the pilot 218 are likely to perceive the motion indicated by the motion data 125 as corresponding to the pilot estimated aircraft state 141, as further described with reference to FIG. 4B. The pilot estimated aircraft state 141 includes an estimated lateral position, an estimated longitudinal position, an estimated altitude, an estimated attitude, an estimated linear motion, an estimated angular motion, or a combination thereof, of the simulated aircraft 204.

In a particular aspect, the analyzer 130 generates (or updates) the pilot estimated aircraft state 141 based on the motion data 125, the pilot activity data 123, the aircraft state data 131, or a combination thereof. In a particular implementation, the analyzer 130 uses a data fusion technique that combines the motion data 125, the pilot activity data 123, the aircraft state data 131, or a combination thereof, to generate (or update) the pilot estimated aircraft state 141. In a particular implementation, the analyzer 130 generates (or updates) the pilot estimated aircraft state 141 by providing the motion data 125, the pilot activity data 123, the aircraft state data 131, or a combination thereof, to the aircraft dynamics model 113. For example, the pilot estimated aircraft state 141 generated (or updated) by the analyzer 130 corresponds to a pilot having a particular level of experience, training, or knowledge adjusting the pilot estimated aircraft state 141 when experiencing the motion indicated by the motion data 125, when performing the pilot activities indicated by the pilot activity data 123, when the simulated aircraft 204 has the detected aircraft states indicated by the aircraft state data 131, or a combination thereof.

In a particular example, the aircraft state data 131 indicates a detected aircraft state 135 of the simulated aircraft 204 at a first time and the pilot activity data 123 indicates a pilot monitoring activity of an instrument display being within a line-of-sight of the pilot 218 at a second time. In this example, the analyzer 130 updates (or generates) the pilot estimated aircraft state 141 to indicate the detected aircraft state 135 based on determining that the instrument display (e.g., a turn coordinator) indicates the detected aircraft state 135 (e.g., a pitch rotation) and that the second time is within a threshold duration of the first time.

In a particular example, the motion data 125 indicates a motion of the simulated aircraft 204 during a first time range, and the pilot activity data 123 indicates no instrument display indicating the motion being within a line-of-sight of the pilot 218 within a threshold duration of the first time range. In this example, the analyzer 130 refrains from updating the pilot estimated aircraft state 141 (e.g., generated by the computational model 111). In a particular aspect, the threshold duration is shorter for an aircraft dynamics model 113 corresponding to a less experienced (e.g., novice) pilot.

In a particular example, the pilot activity data 123 indicates a pilot monitoring activity of an instrument display (or a simulated external environmental feature) being within a line-of-sight of the pilot 218 at a first time, the motion data 125 indicates a motion of the simulated aircraft 204 at a second time subsequent to the first time, and the aircraft state data 131 indicates a detected aircraft state 135 of the simulated aircraft 204 at a third time subsequent to the second time. In this example, the analyzer 130 updates the pilot estimated aircraft state 141 (e.g., generated by the computational model 111 based on the motion data 125) to indicate a predicted aircraft state that is between the pilot estimated aircraft state 141 and the detected aircraft state 135. To illustrate, the aircraft dynamics model 113 corresponding to a more experienced pilot generates a predicted aircraft state that is closer to the detected aircraft state 135.

In a particular example, the flight simulator 202 includes a fixed base flight simulator and the pilot estimated aircraft state 141 is determined independently of the motion data 125 (e.g., the motion data 125 is not generated or is disregarded). The pilot activity data 123 indicates a pilot monitoring activity of an instrument display (or a simulated external environmental feature) being within a line-of-sight of the pilot 218 at a first time, the motion data 125 is absent or indicates no motion of the simulated aircraft 204 at a second time subsequent to the first time, and the aircraft state data 131 indicates a detected aircraft state 135 of the simulated aircraft 204 at a third time subsequent to the second time. In this example, the analyzer 130 updates the pilot estimated aircraft state 141 (e.g., generated by the computational model 111 based on the pilot activity data 123) to indicate a predicted aircraft state that is based on the pilot monitoring activity.

The analyzer 130 determines an estimated error 143, a confidence indicator 145, or both, of the pilot estimated aircraft state 141. For example, the estimated error 143 is based on a difference between the pilot estimated aircraft state 141 and the detected aircraft state 135. To illustrate, the pilot estimated aircraft state 141 indicates an estimated lateral position, an estimated longitudinal position, an estimated altitude, an estimated attitude, an estimated linear motion, an estimated angular motion, or a combination thereof, of the simulated aircraft 204. The detected aircraft state 135 indicates a detected lateral position, a detected longitudinal position, a detected altitude, a detected attitude, a detected linear motion, a detected angular motion, or a combination thereof, of a simulated aircraft 204. The estimated error 143 is based on one or more of a difference between the detected lateral position and the estimated lateral position, the detected longitudinal position and the estimated longitudinal position, the detected altitude and the estimated altitude, the detected attitude and the estimated attitude, the detected linear motion and the estimated linear motion, or the detected angular motion and the estimated angular motion.

In a particular aspect, the estimated error 143 is based on a sum of one or more of a lateral position difference between the detected lateral position and the estimated lateral position, a longitudinal position difference between the detected longitudinal position and the estimated longitudinal position, an altitude difference between the detected altitude and the estimated altitude, an attitude difference between the detected attitude and the estimated attitude, a linear motion difference between the detected linear motion and the estimated linear motion, or an angular motion difference between the detected angular motion and the estimated angular motion.

The confidence indicator 145 (e.g., a confidence interval or a confidence value) indicates a likelihood that the estimated error 143 is correct. In a particular example, the confidence indicator 145 (e.g., a confidence interval) indicates a range of error values (e.g., plus or minus 5 percent) associated with a particular probability value (e.g., 2 standard deviations or 95 percent confidence). In a particular example, if the confidence indicator 145 indicates a low confidence in the estimated error 143 or indicates a wider than threshold range of error values for a particular probability value, the estimated error 143 may be disregarded. Alternatively, if the confidence indicator 145 indicates a high confidence in the estimated error 143 or indicates a narrower than threshold range of error values for the particular probability value, the estimated error 143 may be used in pilot training. In a particular aspect, the analyzer 130 provides the estimated error 143 to a second device, such as a display device 220, another device, or both.

In a particular example, a user 222 (e.g., a flight trainer) can use the estimated error 143 to adjust training of the pilot 218. To illustrate, the user 222 can, in response to determining that the estimated error 143 is greater than an error threshold, that the confidence indicator 145 is greater than a confidence threshold, or both, instruct the pilot 218 to monitor instrument displays more frequently. In a particular example, the estimated error 143 can be associated with particular instrument displays of the simulated aircraft 204 and the user 222 can instruct the pilot 218 to monitor the particular instrument displays more frequently. The aircraft dynamics model 113 enables the pilot training to be tailored to the experience level of the pilot 218. For example, the estimated error 143 is higher for a less experienced pilot failing to monitor the instrument displays for the same duration. In a particular aspect, the analyzer 130 determines the estimated error 143 in real-time, such as during the pilot training session, and can be used to provide feedback to the pilot 218 while training.

Although the device 102, the analyzer 130, the flight simulator 202, and the display device 220 are depicted as separate components, in other implementations the described functionality of two or more of the device 102, the analyzer 130, the flight simulator 202, and the display device 220 can be performed by a single component. In some implementations, one or more components of each of the device 102, the analyzer 130, the flight simulator 202, and the display device 220 can be represented in hardware, such as via an application-specific integrated circuit (ASIC) or a field-programmable gate array (FPGA), or the operations described with reference to the elements may be performed by a processor executing computer-readable instructions.

Although FIG. 2 illustrates particular examples for clarity of explanation, such examples are not to be considered as limitations. For example, although the device 102 is described as including the analyzer 130, in other examples the flight simulator 202 includes the analyzer 130.

In a particular example, the device 102, the analyzer 130, the flight simulator 202, and the display device 220 are interconnected via one or more networks to enable data communications. For example, the device 102 is coupled to the flight simulator 202 via one or more wireless networks, one or more wireline networks, or any combination thereof. Two or more of the device 102, the analyzer 130, the flight simulator 202, and the display device 220 can be co-located or geographically distributed from each other.

Figure 3:
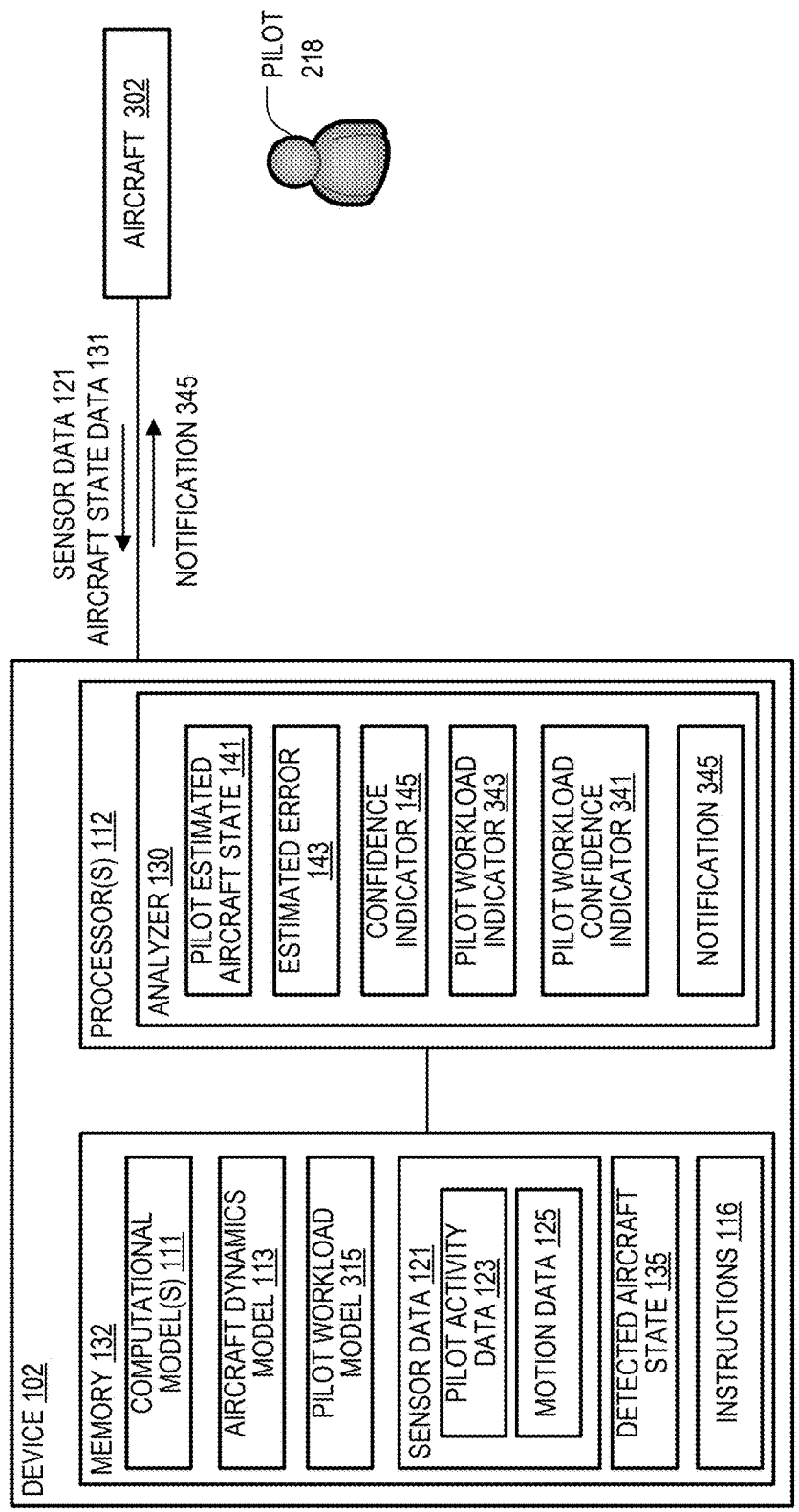
FIG. 3 is a diagram of a particular implementation of a system configured to predict an aircraft state estimated by a pilot during a monitored flight.

FIG. 3 depicts an example of a system 300 configured to predict an aircraft state estimated by a pilot during a monitored flight. The device 102 is communicatively coupled to an aircraft 302. In a particular aspect, the device 102 is integrated in the aircraft 302 and the analyzer 130 is communicatively coupled to one or more components of the aircraft 302. The memory 132 includes a pilot workload model 315. The pilot workload model 315 can be used to generate a pilot workload indicator 343 as an approximation of a mental workload of the pilot 218 during flight. For example, a pilot can experience increased workload during turbulence and abnormal conditions. The analyzer 130 is configured to determine the pilot workload indicator 343 by providing the pilot activity data 123, the motion data 125, the aircraft state data 131, or a combination thereof, to the pilot workload model 315.

During operation, the aircraft 302 generates the sensor data 121, the aircraft state data 131, or a combination thereof. For example, a pilot 218 operates the aircraft 302 during a monitored flight. The aircraft 302 includes one or more instrument displays, one or more aircraft controls, one or more sensors, or a combination thereof. In a particular aspect, the aircraft 302 includes one or more glass screens through which various external environmental features can be visible to the pilot 218.

The sensor data 121 includes pilot activity data 123, motion data 125, or both. The pilot activity data 123 indicates pilot monitoring activity, pilot control activity, or both. In a particular aspect, the pilot activity data 123 indicates pilot monitoring activity, such as times at which various aircraft state indicators are within a line-of-sight of the pilot 218. An aircraft state indicator includes an instrument display, an external environmental feature, or both. An external environmental feature includes a landmark, one or more stars, a moon, a horizon, or a combination thereof.

In a particular example, the aircraft 302 generates the pilot activity data 123 and provides the pilot activity data 123 to the analyzer 130. In another particular example, the analyzer 130 generates the pilot activity data 123 based on the sensor data 121 received from the aircraft 302.

In a particular aspect, the pilot activity data 123 indicates pilot control activity, such as times at which the pilot 218 interacted with an aircraft control of the aircraft 302. The motion data 125 is indicative of detected motion of the aircraft 302. In a particular aspect, the motion data 125 includes angular motion data, linear motion data, or both, of the aircraft 302. For example, the motion data 125 includes a portion of the sensor data 121 that is received from one or more motion sensors (e.g., IMU(s)) that detect motion of the aircraft 302. To illustrate, the motion data 125 indicates a detected rotation about a yaw-axis, a detected rotation about a pitch-axis, a detected rotation about a roll-axis, a detected linear motion, or a combination thereof, of the aircraft 302 at various times. In a particular example, the pilot 218 seated in the aircraft 302 experiences the motion indicated by the motion data 125.

The aircraft state data 131 indicates detected states of the aircraft 302 at various times. For example, a detected aircraft state 135 includes a detected lateral position, a detected longitudinal position, a detected altitude, a detected attitude, a detected linear motion, a detected angular motion, or a combination thereof, of the aircraft 302, at a first time. In a particular aspect, the aircraft state data 131 is generated by one or more sensors or instruments of the aircraft 302.

The analyzer 130 determines a pilot estimated aircraft state 141 based on the sensor data 121. For example, the analyzer 130 provides the motion data 125 to the computational model 111 to generate the pilot estimated aircraft state 141. The pilot estimated aircraft state 141 includes an estimated lateral position, an estimated longitudinal position, an estimated altitude, an estimated attitude, an estimated linear motion, an estimated angular motion, or a combination thereof, of the aircraft 302.

In a particular aspect, the analyzer 130 generates (or updates) the pilot estimated aircraft state 141 based on the motion data 125, the pilot activity data 123, the aircraft state data 131, or a combination thereof, to the aircraft dynamics model 113, as described with reference to FIG. 2. For example, the analyzer 130 uses a data fusion technique to generate the pilot estimated aircraft state 141. As another example, the analyzer 130 provides the motion data 125, the pilot activity data 123, the aircraft state data 131, or a combination thereof, to the aircraft dynamics model 113 to generate the pilot estimated aircraft state 141. In a particular aspect, the pilot estimated aircraft state 141 generated (or updated) by the analyzer 130 corresponds to a pilot having a particular level of experience, training, or knowledge adjusting the pilot estimated aircraft state 141 when experiencing the motion indicated by the motion data 125, when performing the pilot activities indicated by the pilot activity data 123, when the aircraft 302 has the detected aircraft states indicated by the aircraft state data 131, or a combination thereof.

In a particular example, the aircraft state data 131 indicates a detected aircraft state 135 of the aircraft 302 at a first time and the pilot activity data 123 indicates a pilot monitoring activity of an instrument display being within a line-of-sight of the pilot 218 at a second time. In this example, the analyzer 130 updates the pilot estimated aircraft state 141 to indicate the detected aircraft state 135 based on determining that the instrument display (e.g., a turn coordinator) indicates the detected aircraft state 135 (e.g., a pitch rotation) and that the second time is within a threshold duration of the first time.

In a particular example, the motion data 125 indicates a motion of the aircraft 302 during a first time range, and the pilot activity data 123 indicates no instrument display indicating the motion being within a line-of-sight of the pilot 218 within a threshold duration of the first time range. In this example, the analyzer 130 refrains from updating the pilot estimated aircraft state 141 (e.g., generated by the computational model 111). In a particular aspect, the threshold duration is shorter for an aircraft dynamics model 113 corresponding to a less experienced (e.g., novice) pilot.

In a particular example, the pilot activity data 123 indicates a pilot monitoring activity of an instrument display (or a simulated external environmental feature) being within a line-of-sight of the pilot 218 at a first time, the motion data 125 indicates a motion of the aircraft 302 at a second time subsequent to the first time, and the aircraft state data 131 indicates a detected aircraft state 135 of the aircraft 302 at a third time subsequent to the second time. In this example, the analyzer 130 updates to the pilot estimated aircraft state 141 (e.g., generated by the computational model 111 based on the motion data 125) to indicate a predicted aircraft state that is between the pilot estimated aircraft state 141 and the detected aircraft state 135. To illustrate, the aircraft dynamics model 113 corresponding to a more experienced pilot generates a predicted aircraft state that is closer to the detected aircraft state 135.

The analyzer 130 determines an estimated error 143, a confidence indicator 145, or both, of the pilot estimated aircraft state 141. For example, the estimated error 143 is based on one or more of a difference between a detected lateral position and an estimated lateral position, a detected longitudinal position and an estimated longitudinal position, a detected altitude and an estimated altitude, a detected attitude and an estimated attitude, a detected linear motion and an estimated linear motion, or a detected angular motion and an estimated angular motion of the aircraft 302. The confidence indicator 145 (e.g., a confidence interval or a confidence value) indicates a likelihood that the estimated error 143 is correct.

The analyzer 130 is configured to generate a pilot workload indicator 343, a pilot workload confidence indicator 341, or both, by providing the aircraft state data 131, the motion data 125, the pilot activity data 123, or a combination thereof, to the pilot workload model 315. For example, the pilot activity data 123 can include user input from the pilot 218 indicating an amount (e.g., low, medium, or high) of workload being experienced by the pilot 218. In a particular example, the pilot activity data 123 indicates pilot control activity. An amount of pilot workload can be inferred from the pilot control activity. For example, a higher number of aircraft control interactions performed by the pilot 218 within a particular duration indicate a higher pilot workload. In a particular aspect, the pilot activity data 123 includes pilot physiological data. For example, the pilot physiological data is received from one or more sensors that monitor heartrate, respiratory rate, ocular measures, or a combination thereof. To illustrate, a higher heartrate, a higher respiratory rate, a smaller pupil dilation, or a combination thereof, can indicate higher pilot workload. If the aircraft state data 131 indicates a detected aircraft state 135 that corresponds to abnormal or stressful conditions, a higher pilot workload can be inferred. If the motion data 125 indicates motion that corresponds to abnormal or stressful conditions, a higher pilot workload can be inferred.

The pilot workload confidence indicator 341 (e.g., a confidence interval or a confidence value) indicates a likelihood that the pilot workload indicator 343 is correct. In a particular example, the pilot workload confidence indicator 341 (e.g., a confidence interval) indicates a range of error values (e.g., plus or minus 5 percent) associated with a particular probability value (e.g., 2 standard deviations or 95 percent confidence). In a particular example, if the pilot workload confidence indicator 341 indicates a low confidence in the pilot workload indicator 343 or indicates a wider than threshold range of error values for a particular probability value, the pilot workload indicator 343 may be disregarded. Alternatively, if the pilot workload confidence indicator 341 indicates a high confidence in the pilot workload indicator 343 or indicates a narrower than threshold range of error values for the particular probability value, the pilot workload indicator 343 may be used in pilot training. The analyzer 130 generates the pilot workload indicator 343, the pilot workload confidence indicator 341, or both, by providing the pilot activity data 123 (e.g., the user input, the pilot control activity, the pilot physiological data, or a combination thereof), the aircraft state data 131 (e.g., the detected aircraft state 135), the motion data 125, or a combination thereof, to the pilot workload model 315.

The analyzer 130 is configured to selectively activate a notification 345 based on the estimated error 143, the confidence indicator 145, the pilot workload indicator 343, the pilot workload confidence indicator 341, or a combination thereof. For example, the analyzer 130 activates the notification 345 based on determining that the estimated error 143 exceeds an error threshold, the confidence indicator 145 exceeds an error confidence threshold, the pilot workload indicator 343 exceeds a pilot workload threshold, the pilot workload confidence indicator 341 exceeds a pilot workload confidence threshold, or a combination thereof. In a particular aspect, activating the notification 345 activates autopilot control of the aircraft 302, sends a control signal (e.g., to activate autopilot control) to the aircraft 302, sends an alert to an off-board system, provides an alert to a display, outputs an alert via a speaker, sends the estimated error 143 to a second device (e.g., a storage device, an off-board system, or a display), or a combination thereof. In a particular aspect, the notification 345 includes a control signal (e.g., to activate autopilot), an alert, the estimated error 143, or a combination thereof. Activating the notification 345 can enable measures to reduce the pilot workload or improve pilot situational awareness.

Although the device 102, the analyzer 130, and the aircraft 302 are depicted as separate components, in other implementations the described functionality of two or more of the device 102, the analyzer 130, and the aircraft 302 can be performed by a single component. In some implementations, one or more components of each of the device 102, the analyzer 130, and the aircraft 302 can be represented in hardware, such as via an application-specific integrated circuit (ASIC) or a field-programmable gate array (FPGA), or the operations described with reference to the elements may be performed by a processor executing computer-readable instructions.

Figure 4A:
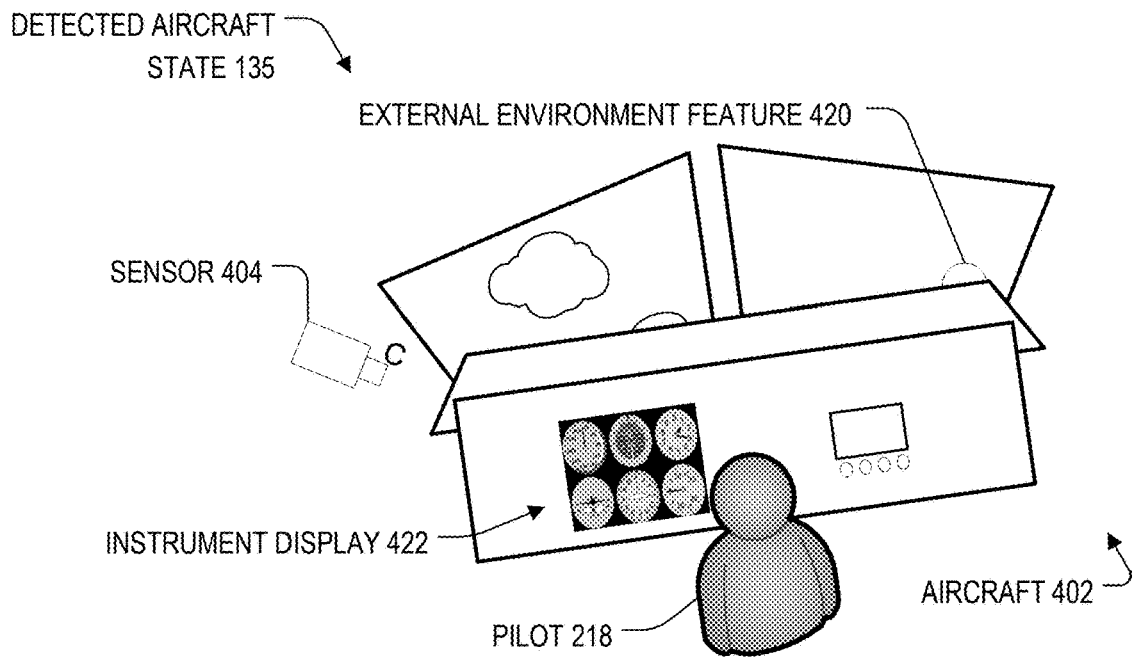
FIG. 4A is a diagram of an example of aircraft state that may be detected by the systems of FIGS. 1-3.

FIG. 4A depicts an example of a detected aircraft state 135 of an aircraft 402. In a particular aspect, the aircraft 402 corresponds to the simulated aircraft 204 of FIG. 2 or the aircraft 302 of FIG. 3. For example, a pilot 218 is seated in a cockpit of the aircraft 402. One or more external environmental features (e.g., simulated external environmental features or actual external environmental features) are visible through screens of the aircraft 402, such as external environmental feature 420 (e.g., a simulated Sun or the actual Sun). The aircraft 402 includes one or more sensors, such as a sensor 404 (e.g., a camera). The aircraft 402 includes one or more instrument displays, such as an instrument display 422 (e.g., a turn coordinator). The detected aircraft state 135 indicates a rotation about a roll-axis (e.g., an 8-degree rotation).

Figure 4B:
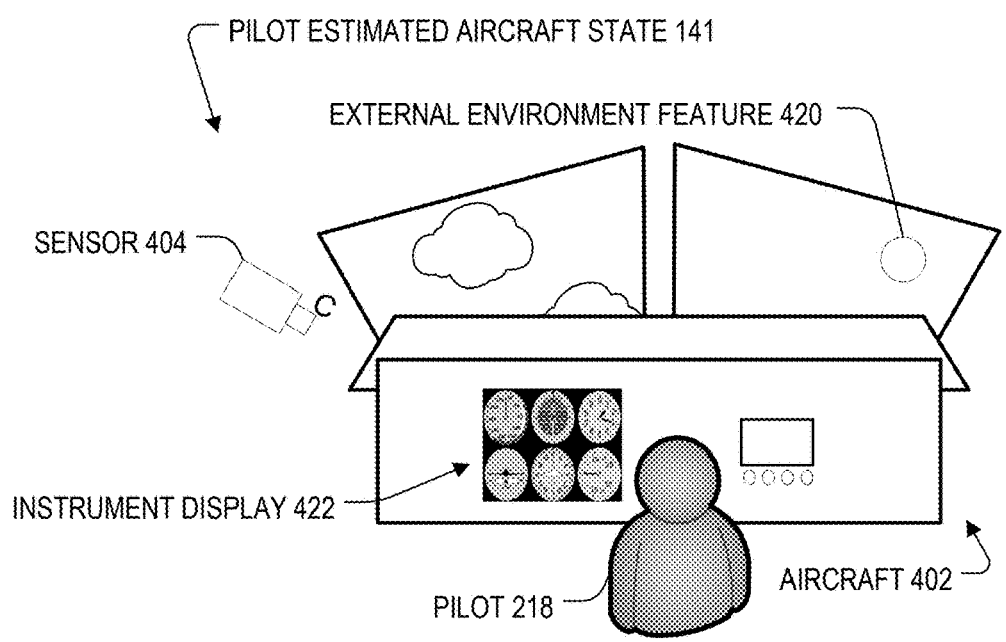
FIG. 4B is a diagram of an example of pilot estimated aircraft state that may be predicted by the systems of FIGS. 1-3.

FIG. 4B depicts an example of a pilot estimated aircraft state 141. In a particular aspect, the example of the pilot estimated aircraft state 141 of FIG. 4B corresponds to the example of the detected aircraft state 135 of FIG. 4A. For example, during a sustained banking maneuver, providing motion data 125 corresponding to the rotation about the roll-axis over a particular time period to the computational model 111 of FIG. 1 can predict the pilot estimated aircraft state 141 corresponding to no banking (e.g., a 0-degree rotation about the roll-axis). In some examples, the analyzer 130, based on the motion data 125 and the pilot activity data 123, refrains from updating the pilot estimated aircraft state 141 because the instrument display 422, the external environmental feature 420, or both, have not been within a line-of-sight of the pilot 218 during the banking maneuver.

The estimated error 143 is based on a comparison of the detected aircraft state 135 (e.g., an 8-degree rotation about the roll-axis) and the pilot estimated aircraft state 141 (e.g., a 0-degree rotation about the roll-axis). To illustrate, the estimated error 143 is based on a difference between the pilot estimated aircraft state 141 and the detected aircraft state 135 (e.g., 0−8=−8 degrees rotation about the roll-axis).

In the example of FIG. 2, the analyzer 130 provides the estimated error 143 to the display device 220. The user 222 (e.g., a flight trainer) can, during pilot training, request the pilot 218 to monitor the instrument display 422, the external environmental feature 420, or both. The analyzer 130, based on the pilot activity data 123 (e.g., updated pilot activity data 123) indicating a pilot monitoring activity of the instrument display 422, the external environmental feature 420, or both, being in a line-of-sight of the pilot 218, updates the pilot estimated aircraft state 141 to match the detected aircraft state 135 more closely (e.g., exactly). The pilot 218 can improve his or her flight skills for future flights because of the feedback from the user 222. In a particular example, the estimated error 143 is displayed by the flight simulator 202 to the pilot 218 as a feedback mechanism and the pilot 218 self-adjusts the pilot monitoring activities.

In the example of FIG. 3, the analyzer 130 can selectively activate the notification 345 based on the pilot estimated aircraft state 141, a pilot workload indicator 343, or both. In a particular example, the analyzer 130 refrains from activating the notification 345 in response to determining that the pilot workload indicator 343 (e.g., a low workload) is lower than a workload threshold (e.g., a medium workload threshold) and the estimated error 143 (e.g., −8 degrees rotation about the roll-axis) is lower than a first error threshold (e.g., −20 degrees). In another example, the analyzer 130 activates the notification 345 in response to determining that the pilot workload indicator 343 (e.g., a medium workload) is greater than or equal to the workload threshold (e.g., a medium workload threshold) and the estimated error 143 (e.g., −8 degrees rotation about the roll-axis) is greater than or equal to a second error threshold (e.g., −5 degrees). In a particular aspect, activating the notification 345 generates an alert that causes the pilot 218 to monitor the instrument display 422, the external environmental feature 420, or both, indicating the rotation about the roll-axis.

The analyzer 130, based on the pilot activity data 123 (e.g., updated pilot activity data 123) indicating a pilot monitoring activity of the instrument display 422, the external environmental feature 420, or both, being in a line-of-sight of the pilot 218, updates the pilot estimated aircraft state 141 to match the detected aircraft state 135 more closely (e.g., exactly). Activating the notification 345 can thus improve situational awareness by the pilot 218. In a particular example, activating the notification 345 can reduce pilot workload by activating autopilot control or other pilot support features of the aircraft 402.

Figure 5:
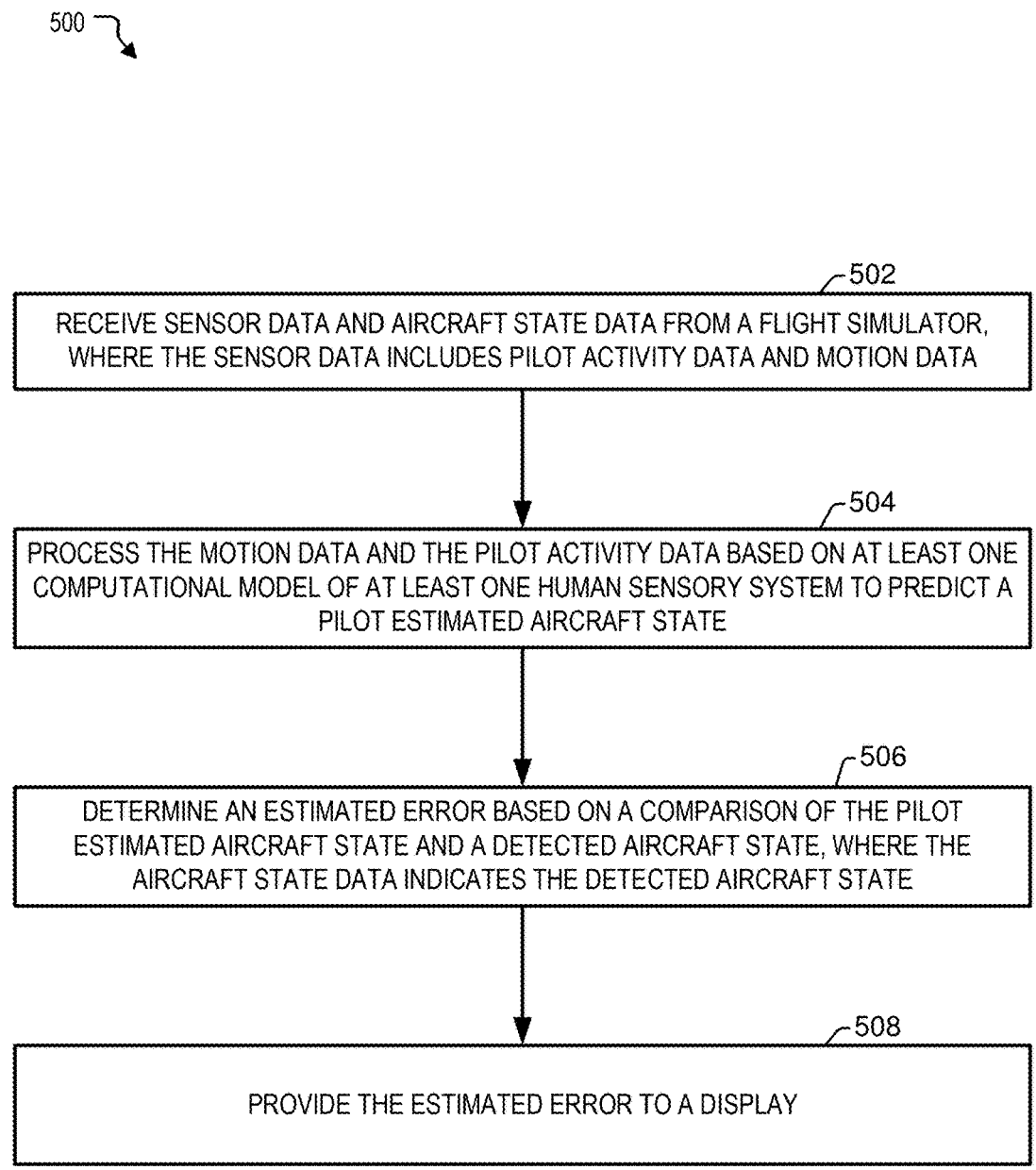
FIG. 5 is a flow chart of an example of a method of predicting a pilot estimated aircraft state during pilot training.

Referring to FIG. 5, an example of a method of predicting a pilot estimated aircraft state during pilot training is shown and generally designated method 500. In a particular aspect, one or more operations of the method 500 are performed by the analyzer 130, the processor 112, the device 102, the system 100 of FIG. 1, the flight simulator 202, the system 200 of FIG. 2, or a combination thereof.

The method 500 includes receiving sensor data and aircraft state data from a flight simulator, at 502. For example, the analyzer 130 receives the sensor data 121 and the aircraft state data 131 from the flight simulator 202, as described with reference to FIG. 2. The sensor data 121 includes the pilot activity data 123 and the motion data 125.

The method 500 also includes processing the motion data and the pilot activity data based on at least one computational model of at least one human sensory system to predict a pilot estimated aircraft state, at 504. For example, the analyzer 130 processes the motion data 125 and the pilot activity data 123 based on the computational model 111, the aircraft dynamics model 113, or a combination thereof, to predict a pilot estimated aircraft state 141, as described with reference to FIGS. 1-2.

The method 500 further includes determining an estimated error based on a comparison of the pilot estimated aircraft state and a detected aircraft state, at 506. For example, the analyzer 130 determines an estimated error 143 based on a comparison of the pilot estimated aircraft state 141 and the detected aircraft state 135, as described with reference to FIGS. 1-2 and 4B. The aircraft state data 131 indicates the detected aircraft state 135.

The method 500 also includes providing the estimated error to a display, at 508. For example, the analyzer 130 provides the estimated error 143 to the display device 220 of FIG. 2.

The method 500 thus facilitates pilot training by measuring a difference between a predicted estimate by the pilot of an aircraft state and a detected aircraft state so that relevant feedback regarding instrument scanning, etc., can be provided to the pilot. To illustrate, if the difference is higher than an error threshold, the pilot can be requested to more frequently monitor instrument displays, external environmental features, or a combination thereof.

Figure 6:
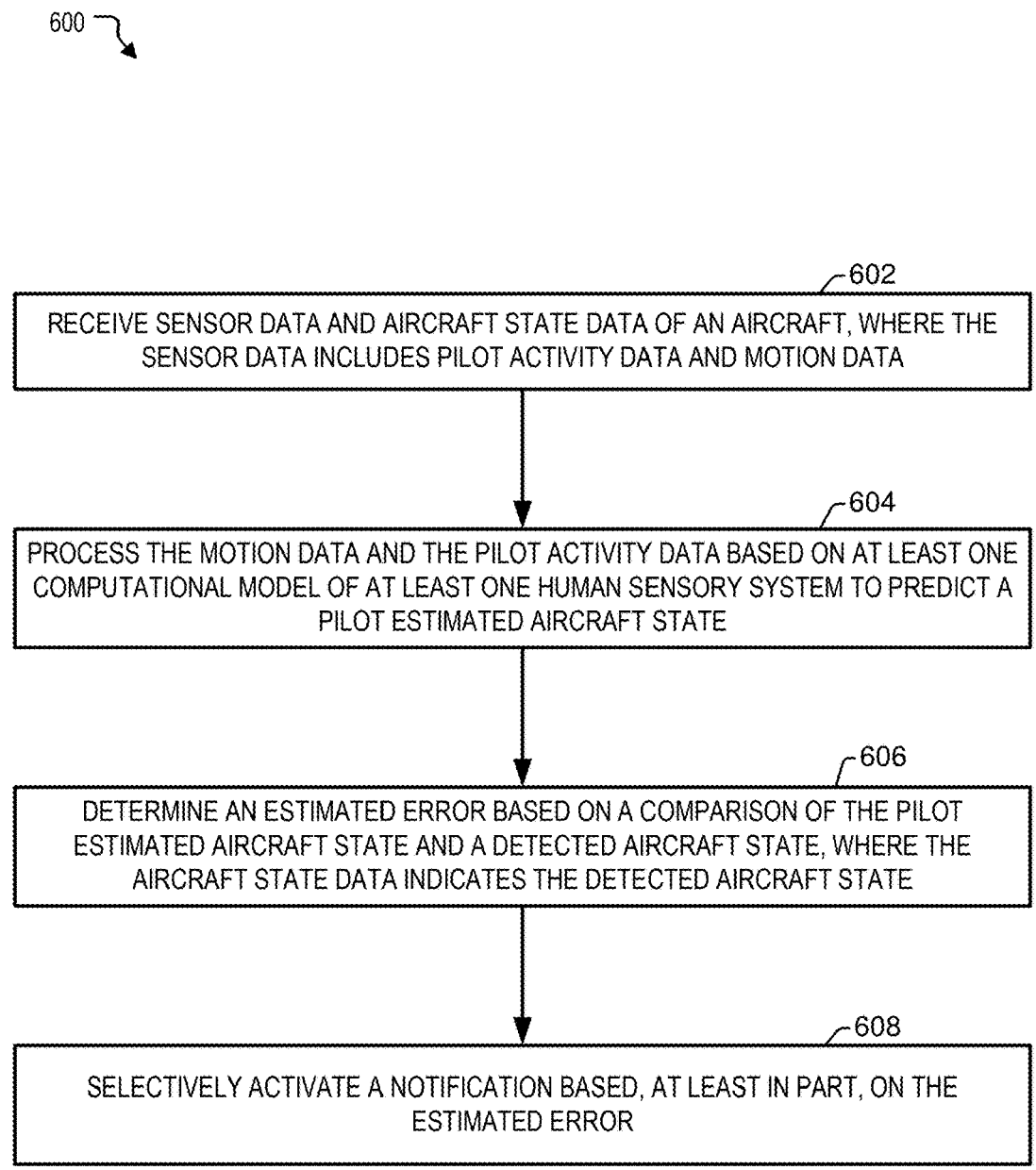
FIG. 6 is a flow chart of an example of a method of predicting a pilot estimated aircraft state during a monitored flight.

Referring to FIG. 6, an example of a method of predicting a pilot estimated aircraft state during a monitored flight is shown and generally designated method 600. In a particular aspect, one or more operations of the method 600 are performed by the analyzer 130, the processor 112, the device 102, the system 100 of FIG. 1, the aircraft 302, the system 300 of FIG. 3, or a combination thereof.

The method 600 includes receiving sensor data and aircraft state data of an aircraft, at 602. For example, the analyzer 130 receives the sensor data 121 and the aircraft state data 131 of the aircraft 302, as described with reference to FIGS. 1 and 3. The sensor data 121 includes pilot activity data 123 and motion data 125.

The method 600 also includes processing the motion data and the pilot activity data based on at least one computational model of at least one human sensory system to predict a pilot estimated aircraft state, at 604. For example, the analyzer 130 processes the motion data 125 and the pilot activity data 123 based on the computational model 111, the aircraft dynamics model 113, or a combination thereof, to predict a pilot estimated aircraft state 141, as described with reference to FIGS. 1 and 3.

The method 600 further includes determining an estimated error based on a comparison of the pilot estimated aircraft state and a detected aircraft state, at 606. For example, the analyzer 130 determines an estimated error 143 based on a comparison of the pilot estimated aircraft state 141 and a detected aircraft state 135, as described with reference to FIGS. 1, 3, and 4B. The aircraft state data 131 indicates the detected aircraft state 135.

The method 600 also includes selectively activating a notification based, at least in part, on the estimated error, at 608. For example, the analyzer 130 selectively activates a notification 345 based, at least in part, on the estimated error 143, as described with reference to FIGS. 3 and 4B.

The method 600 thus enables pilot monitoring that identifies a difference between a predicted estimate by the pilot of an aircraft state and a detected aircraft state. If the difference is higher than an error threshold, actions can be taken to improve pilot situational awareness (e.g., alerting the pilot) or to reduce pilot workload (e.g., activating an autopilot).

Figure 7:
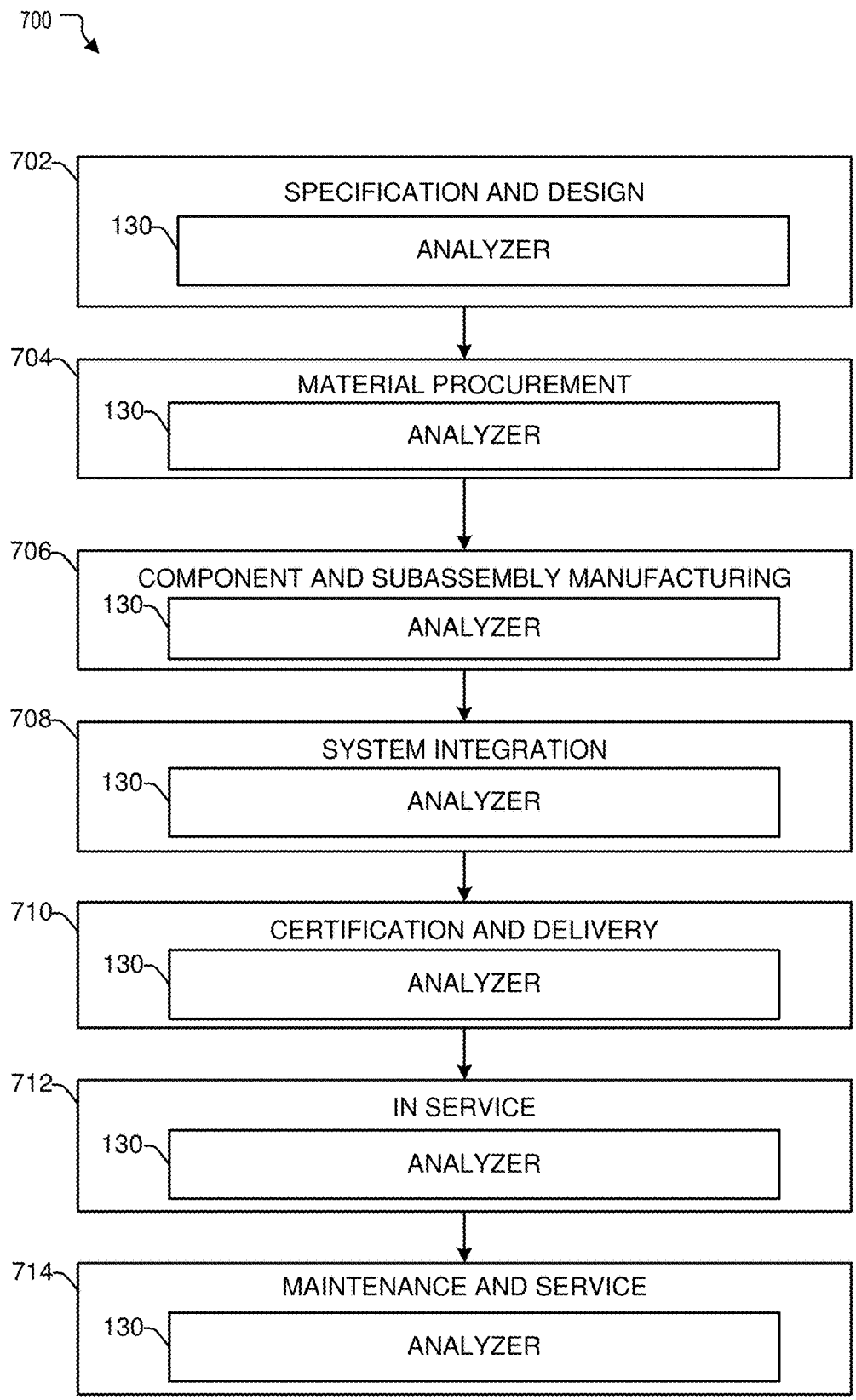
FIG. 7 is a flow chart illustrating a life cycle of an aircraft that is configured to predict an aircraft state estimated by a pilot.

Referring to FIG. 7, a flowchart illustrative of a life cycle of an aircraft that includes the analyzer 130 is shown and designated method 700. During pre-production, the exemplary method 700 includes, at 702, specification and design of an aircraft, such as the aircraft 800 described with reference to FIG. 8. During specification and design of the aircraft, the method 700 may include specification and design of the analyzer 130. At 704, the method 700 includes material procurement, which may include procuring materials for the analyzer 130.

During production, the method 700 includes, at 706, component and subassembly manufacturing and, at 708, system integration of the aircraft. For example, the method 700 may include component and subassembly manufacturing of the analyzer 130 and system integration of the analyzer 130. At 710, the method 700 includes certification and delivery of the aircraft and, at 712, placing the aircraft in service. Certification and delivery may include certification of the analyzer 130 to place the analyzer 130 in service. While in service by a customer, the aircraft may be scheduled for routine maintenance and service (which may also include modification, reconfiguration, refurbishment, and so on). At 714, the method 700 includes performing maintenance and service on the aircraft, which may include performing maintenance and service on the analyzer 130.

Each of the processes of the method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Aspects of the disclosure can be described in the context of an example of a vehicle. A particular example of a vehicle is an aircraft 800 as shown in FIG. 8.

Figure 8:
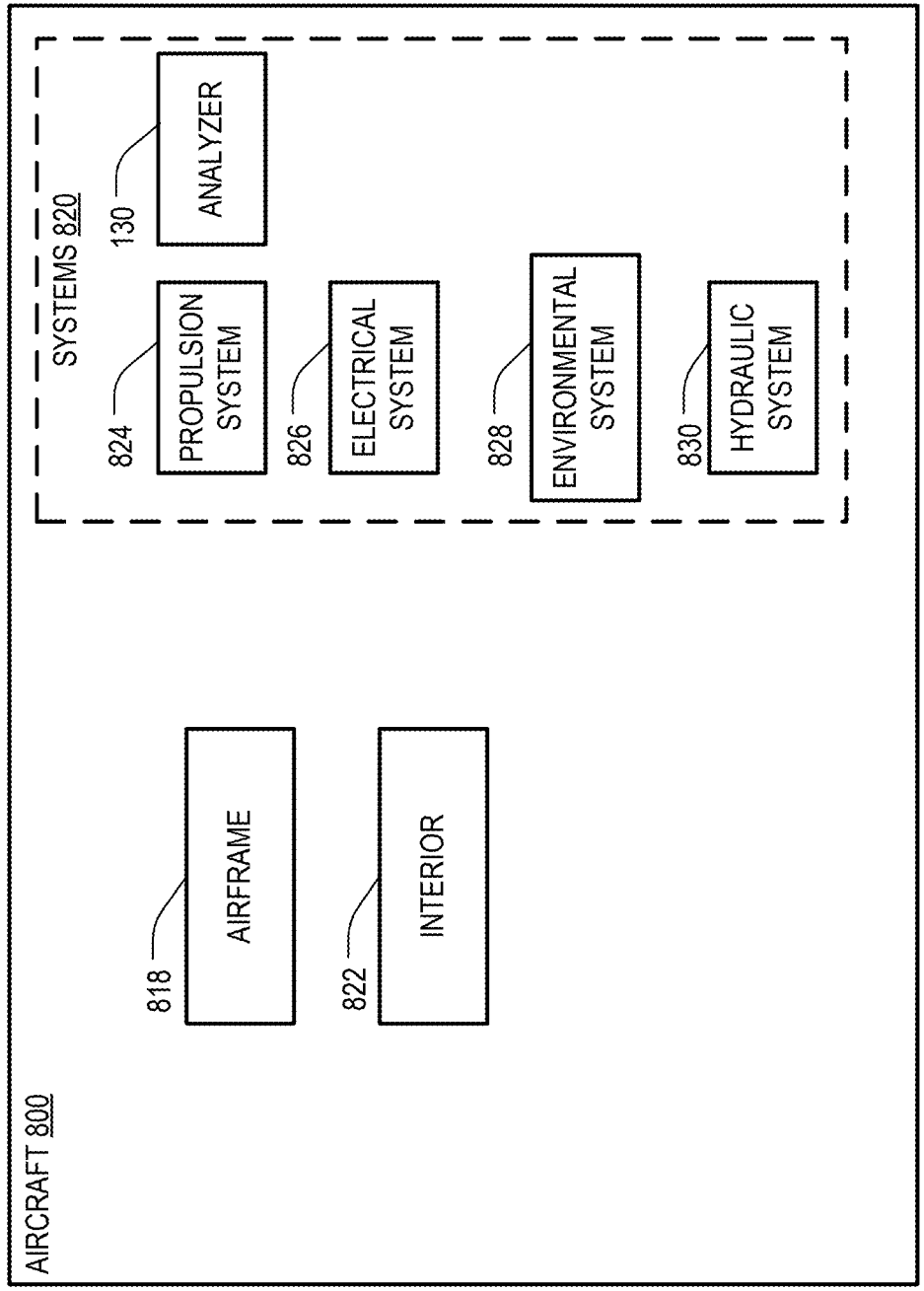
FIG. 8 is a block diagram of an aircraft that is configured to predict an aircraft state estimated by a pilot.

In the example of FIG. 8, the aircraft 800 includes an airframe 818 with a plurality of systems 820 and an interior 822. Examples of the plurality of systems 820 include one or more of a propulsion system 824, an electrical system 826, an environmental system 828, a hydraulic system 830, and the analyzer 130. Any number of other systems may be included. In a particular aspect, the aircraft 800 corresponds to the aircraft 302 of FIG. 3.

Figure 9:
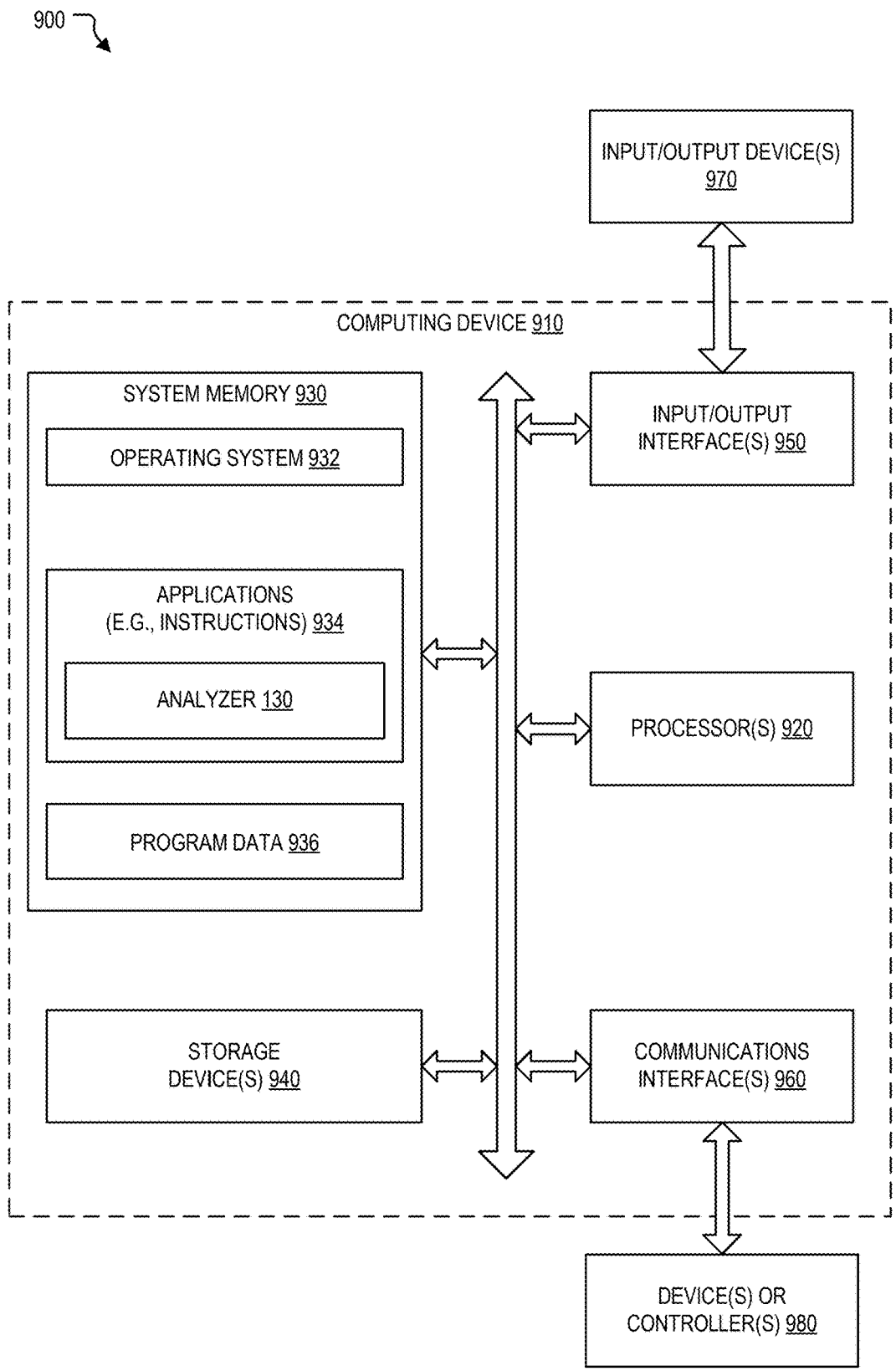
FIG. 9 is a block diagram of a computing environment including a computing device configured to support aspects of computer-implemented methods and computer-executable program instructions (or code) according to the present disclosure.

FIG. 9 is a block diagram of a computing environment 900 including a computing device 910 configured to support aspects of computer-implemented methods and computer-executable program instructions (or code) according to the present disclosure. For example, the computing device 910, or portions thereof, is configured to execute instructions to initiate, perform, or control one or more operations described with reference to FIGS. 1-6.

The computing device 910 includes one or more processors 920. The processor(s) 920 are configured to communicate with system memory 930, one or more storage devices 940, one or more input/output interfaces 950, one or more communications interfaces 960, or any combination thereof. The system memory 930 includes volatile memory devices (e.g., random access memory (RAM) devices), nonvolatile memory devices (e.g., read-only memory (ROM) devices, programmable read-only memory, and flash memory), or both. The system memory 930 stores an operating system 932, which may include a basic input/output system for booting the computing device 910 as well as a full operating system to enable the computing device 910 to interact with users, other programs, and other devices. The system memory 930 stores system (program) data 936, such as the computational model 111, the aircraft dynamics model 113, the sensor data 121, the pilot activity data 123, the motion data 125, the aircraft state data 131, the detected aircraft state 135, the pilot estimated aircraft state 141, the estimated error 143 of FIG. 1, the pilot workload model 315, the pilot workload indicator 343, the notification 345, or a combination thereof.

The system memory 930 includes one or more applications 934 (e.g., sets of instructions) executable by the processor(s) 920. As an example, the one or more applications 934 include instructions executable by the processor(s) 920 to initiate, control, or perform one or more operations described with reference to FIGS. 1-9. To illustrate, the one or more applications 934 include instructions executable by the processor(s) 920 to initiate, control, or perform one or more operations described with reference to the analyzer 130.

In a particular implementation, the system memory 930 includes a non-transitory, computer-readable medium storing the instructions that, when executed by the processor(s) 920, cause the processor(s) 920 to initiate, perform, or control operations to predict an aircraft state estimated by a pilot. The operations include receiving sensor data and aircraft state data from a flight simulator. The sensor data includes pilot activity data and motion data. The operations also include processing the motion data and the pilot activity data based on at least one computational model of at least one human sensory system to predict a pilot estimated aircraft state. The operations further include determining an estimated error based on a comparison of the pilot estimated aircraft state and a detected aircraft state. The aircraft state data indicates the detected aircraft state. The operations also include providing the estimated error to a device.

In a particular aspect, the operations include receiving sensor data and aircraft state data of an aircraft. The sensor data includes pilot activity data and motion data. The operations also include processing the motion data and the pilot activity data based on at least one computational model of at least one human sensory system to predict a pilot estimated aircraft state. The operations further include determining an estimated error based on a comparison of the pilot estimated aircraft state and a detected aircraft state. The aircraft state data indicates the detected aircraft state. The operations also include selectively activating a notification based, at least in part, on the estimated error.

The one or more storage devices 940 include nonvolatile storage devices, such as magnetic disks, optical disks, or flash memory devices. In a particular example, the storage devices 940 include both removable and non-removable memory devices. The storage devices 940 are configured to store an operating system, images of operating systems, applications (e.g., one or more of the applications 934), and program data (e.g., the program data 936). In a particular aspect, the system memory 930, the storage devices 940, or both, include tangible computer-readable media. In a particular aspect, one or more of the storage devices 940 are external to the computing device 910. In a particular aspect, the system memory 930 includes the memory 132 of FIG. 1.

The one or more input/output interfaces 950 that enable the computing device 910 to communicate with one or more input/output devices 970 to facilitate user interaction. For example, the one or more input/output interfaces 950 can include a display interface, an input interface, or both. For example, the input/output interface 950 is adapted to receive input from a user, to receive input from another computing device, or a combination thereof. In some implementations, the input/output interface 950 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 970 includes one or more user interface devices and displays, including some combination of buttons, keyboards, pointing devices, displays, speakers, microphones, touch screens, and other devices. In a particular aspect, the input/output device 970 includes the display device 220 of FIG. 2.

The processor(s) 920 are configured to communicate with devices or controllers 980 via the one or more communications interfaces 960. For example, the one or more communications interfaces 960 can include a network interface. The devices or controllers 980 can include, for example, the device 102 of FIG. 1, the flight simulator 202, the aircraft 302 of FIG. 3, one or more other devices, or any combination thereof.

In conjunction with the described systems and methods, an apparatus for pilot training is disclosed that includes means for storing at least one computational model of at least one human sensory system. In some implementations, the means for storing corresponds to the memory 132 of FIG. 1, the system memory 930, one or more other circuits or devices configured to store at least one computational model of at least one human sensory system, or a combination thereof.

The apparatus also includes means for receiving sensor data and aircraft state data from a flight simulator. For example, the means for receiving can correspond to the one or more communications interfaces 960 of FIG. 9, one or more other devices configured to receive sensor data and aircraft state data from a flight simulator, or a combination thereof.

The apparatus further includes means for processing the motion data and the pilot activity data based on the at least one computational model to predict a pilot estimated aircraft state, means for determining an estimated error based on a comparison of the pilot estimated aircraft state and a detected aircraft state, and means for providing the estimated error to a second device. The means for processing, the means for determining, and the means for providing can correspond to the analyzer 130, the processor(s) 112, the device 102, the system 100 of FIG. 1, the flight simulator 202, the simulated aircraft 204, the system 200 of FIG. 2, the computing device 910, the processor(s) 920, one or more other circuits or devices configured to process motion data and pilot activity data, to determine an estimated error, to provide the estimated error to a second device, or a combination thereof.

Also in conjunction with the described systems and methods, an apparatus for pilot evaluation during aircraft operation is disclosed that includes means for storing at least one computational model of at least one human sensory system. In some implementations, the means for storing corresponds to the memory 132 of FIG. 1, the system memory 930, one or more other circuits or devices configured to store at least one computational model of at least one human sensory system, or a combination thereof.

The apparatus also includes means for receiving sensor data and aircraft state data of an aircraft. For example, the means for receiving can correspond to the one or more communications interfaces 960 of FIG. 9, one or more other devices configured to receive sensor data and aircraft state data of an aircraft, or a combination thereof.

The apparatus further includes means for processing the motion data and the pilot activity data based on the at least one computational model to predict a pilot estimated aircraft state, means for determining an estimated error based on a comparison of the pilot estimated aircraft state and a detected aircraft state, and means for selectively activating a notification based, at least in part, on the estimated error. The means for processing, the means for determining, and the means for selectively activating can correspond to the analyzer 130, the processor(s) 112, the device 102, the system 100 of FIG. 1, the aircraft 302, the system 300 of FIG. 3, the computing device 910, the processor(s) 920, one or more other circuits or devices configured to process motion data and pilot activity data, to determine an estimated error, to selectively activation a notification based, at least in part, on the estimated error, or a combination thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-9. In some implementations, part or all of one or more of the operations or methods of FIGS. 1-9 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device for pilot training, the device comprising:
a memory configured to store one or more computational models of one or more human sensory systems;
a plurality of interfaces configured to receive an experience level associated with a pilot using a flight simulator, sensor data, and aircraft state data from the flight simulator, wherein the sensor data comprises pilot activity data and motion data, and wherein the motion data is indicative of detected motion of a simulated aircraft of the flight simulator; and
one or more processors configured to:
adjust the one or more computational models based on the experience level;
process the motion data and the pilot activity data based on the experience level and the one or more computational models to predict a pilot estimated aircraft state;
determine an estimated error based on a comparison of the pilot estimated aircraft state and a detected aircraft state, wherein the aircraft state data indicates the detected aircraft state;
determine a probability that a confidence indicator indicates a confidence in the estimated error;
in response to a determination that the probability is greater than a confidence threshold, determine that the estimated error exceeds an error threshold value, wherein the error threshold value is based on the experience level; and
provide the estimated error to a trainer associated with the flight simulator via a second device to enable the trainer to provide one or more instructions to a user of the flight simulator during use of the flight simulator based on the estimated error exceeding the error threshold value, wherein the one or more instructions comprise an instruction to more frequently observe one or more components of an instrument display.

2. The device of claim 1, wherein the pilot activity data indicates pilot monitoring activity, pilot control activity, or both.

3. The device of claim 1, wherein the one or more computational models comprise a vestibular model, a visual model, a proprioceptive model, or a combination thereof.

4. The device of claim 1, wherein the motion data comprises angular motion data, linear motion data, or both.

5. The device of claim 1, wherein the detected aircraft state comprises a detected lateral position, a detected longitudinal position, a detected altitude, a detected attitude, a detected linear motion, a detected angular motion, or a combination thereof, of the simulated aircraft.

6. The device of claim 1, wherein the aircraft state data indicates that the simulated aircraft has the detected aircraft state at a first time, and wherein the one or more processors are configured to predict the pilot estimated aircraft state based, at least in part, on determining that the pilot activity data indicates that an aircraft state indicator is in a line-of-sight of a pilot at a second time and that the second time is within a threshold duration of the first time.

7. The device of claim 6, wherein the aircraft state indicator comprises the instrument display, a simulated external environmental feature, or both.

8. The device of claim 7, wherein components of the instrument display comprise an altimeter, an attitude indicator, a heading indicator, an airspeed indicator, a turn coordinator, a vertical speed indicator, a latitude indicator, a longitude indicator, or a combination thereof.

9. The device of claim 1, wherein the memory is further configured to store an aircraft dynamics model, and wherein the one or more processors are configured to process one or more of the aircraft state data, the motion data, or the pilot activity data based on the aircraft dynamics model to predict the pilot estimated aircraft state.

10. A method of pilot training, the method comprising:
receiving, at a device, sensor data and aircraft state data from a flight simulator, wherein the sensor data comprises pilot activity data and motion data, and wherein the motion data is indicative of detected motion of a simulated aircraft of the flight simulator;

adjusting, at the device, one or more computational models of at least one human sensory system based on an experience level associated with a pilot using the flight simulator;

processing, at the device, the motion data and the pilot activity data based on the experience level and based on the one or more computational models to predict a pilot estimated aircraft state;

determining, at the device, an estimated error based on a comparison of the pilot estimated aircraft state and a detected aircraft state, wherein the aircraft state data indicates the detected aircraft state;

determining a probability that a confidence indicator indicates a confidence in the estimated error;

in response to a determination that the probability is greater than a confidence threshold, determining that the estimated error exceeds an error threshold value, wherein the error threshold value is based on the experience level; and providing the estimated error to a trainer associated with the flight simulator via a second device to enable the trainer to provide one or more instructions to a user of the flight simulator during use of the flight simulator based on the estimated error exceeding the error threshold value, wherein the one or more instructions comprise an instruction to more frequently observe one or more components of an instrument display.

11. The method of claim 10, wherein the pilot activity data comprises first activity sensor data received from a non-contact sensor, second activity sensor data received from a contact sensor, or both.

12. The method of claim 10, wherein the pilot estimated aircraft state comprises an estimated lateral position, an estimated longitudinal position, an estimated altitude, an estimated attitude, an estimated linear motion, an estimated angular motion, or a combination thereof, of the simulated aircraft.

13. The method of claim 10, wherein the aircraft state data indicates that the simulated aircraft has the detected aircraft state at a first time, and wherein the pilot estimated aircraft state is predicted based, at least in part, on determining that the pilot activity data indicates that an aircraft state indicator is in a line-of-sight of a pilot at a second time and that the second time is within a threshold duration of the first time.

14. The method of claim 13, wherein the aircraft state indicator comprises the instrument display, a simulated external environmental feature, or both.

15. The method of claim 14, wherein the instrument display comprises an altimeter, an attitude indicator, a heading indicator, an airspeed indicator, a turn coordinator, a vertical speed indicator, a latitude indicator, a longitude indicator, or a combination thereof.

16. A computer-readable storage device storing instructions that, when executed by one or more processors, cause the one or more processors to initiate, perform, or control operations to:

receive sensor data and aircraft state data from a flight simulator, wherein the sensor data comprises pilot activity data of a pilot and motion data, and wherein the motion data is indicative of detected motion of a simulated aircraft of the flight simulator;

adjust one or more computational models based on an experience level of the pilot;

process the motion data and the pilot activity data based on the experience level and based on one or more computational models to predict a pilot estimated aircraft state;

determine an estimated error based on a comparison of the pilot estimated aircraft state and a detected aircraft state, wherein the aircraft state data indicates the detected aircraft state;

determine a probability that a confidence indicator indicates a confidence in the estimated error;

in response to a determination that the probability is greater than a confidence threshold, determine that the estimated error exceeds an error threshold value, wherein the error threshold value is based on the experience level; and provide the estimated error to a trainer associated with the flight simulator via a device to enable the trainer to provide one or more instructions to a user of the flight simulator during use of the flight simulator based on the estimated error exceeding that error threshold value, wherein the one or more instructions comprise an instruction to more frequently observe one or more components of an instrument display.

17. The computer-readable storage device of claim 16, wherein the detected aircraft state comprises a detected lateral position, a detected longitudinal position, a detected altitude, a detected attitude, a detected linear motion, a detected angular motion, or a combination thereof, of the simulated aircraft.

18. The computer-readable storage device of claim 17, wherein the pilot estimated aircraft state comprises an estimated lateral position, an estimated longitudinal position, an estimated altitude, an estimated attitude, an estimated linear motion, an estimated angular motion, or a combination thereof, of the simulated aircraft.

19. The computer-readable storage device of claim 18, wherein the estimated error is based on one or more of a difference between the detected lateral position and the estimated lateral position, the detected longitudinal position and the estimated longitudinal position, the detected altitude and the estimated altitude, the detected attitude and the estimated attitude, the detected linear motion and the estimated linear motion, or the detected angular motion and the estimated angular motion.

20. The computer-readable storage device of claim 16, wherein the aircraft state data indicates that the simulated aircraft has the detected aircraft state at a first time, and wherein the pilot estimated aircraft state is predicted based, at least in part, on determining that the pilot activity data indicates that an aircraft state indicator is in a line-of-sight of a pilot at a second time and that the second time is within a threshold duration of the first time.

* * * * *